Aug. 27, 1929.  R. S. SANFORD  1,726,413

BRAKE MECHANISM

Filed Nov. 10, 1927

INVENTOR
Roy S. Sanford
BY
Burton & Wrenn
ATTORNEYS.

Patented Aug. 27, 1929.

1,726,413

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE MECHANISM.

Application filed November 10, 1927. Serial No. 232,254.

My invention relates to improvements in brake mechanism and particularly to an improved cam intended to be employed as the operating cam in the actuation of a brake shoe.

An object is to provide in such a structure a simple, rugged, durable cam of light weight which is capable of being easily and cheaply manufactured and assembled and is salable at a low price. The cam is of such a character that it lends itself particularly well to mass production, assembly and use.

Other advantages and meritorious features of my improvement will more fully appear from the following specification, appended claims and accompanying drawing, wherein:

Figure 1:
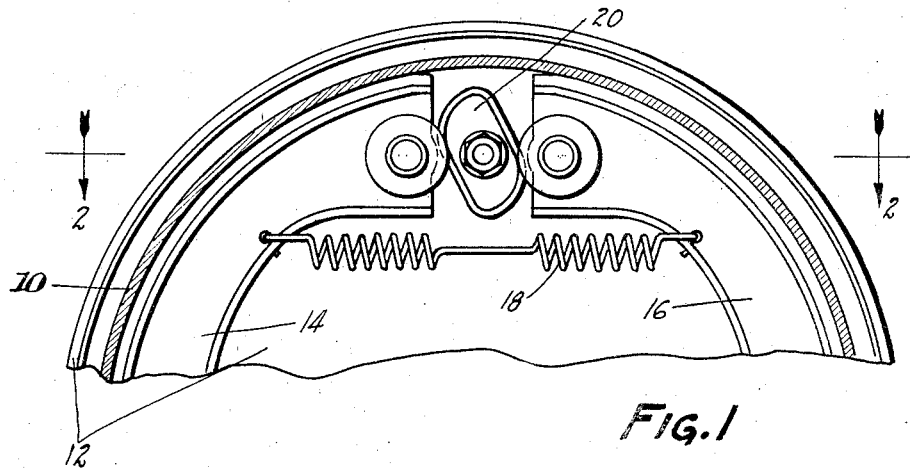
Fig. 1 is a fragmentary elevation through a brake drum showing a pair of brake shoes operated by my improved cam.
Figure 2:
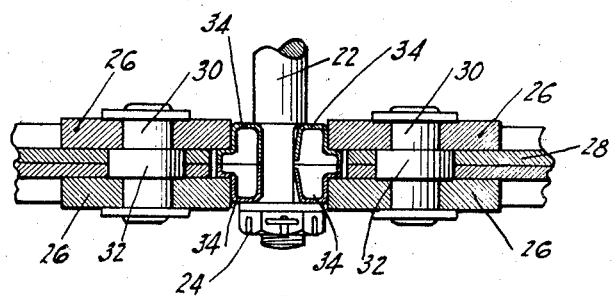
Fig. 2 is a sectional view taken on line 2—2 of Fig. 1.
Figure 3:
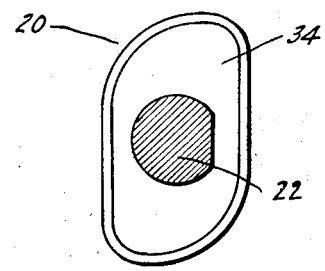
Fig. 3 is a side elevation of the cam itself.

In the drawing, let 10 indicate a brake drum having a backing plate 12 and within which are supported two brake shoes, 14 and 16 respectively. 18 is a restraining spring tensioning the shoes toward the cam 20. The cam is mounted upon a camshaft 22 and 24 indicates a lock nut adapted to hold the cam against the shoulder on the shaft.

Each shoe is provided with a pair of bearing rollers 26 mounted on opposite sides of a central web 28. Each pair of rollers is supported upon a pin 30 which extends through the web 28 and has a portion 32 disposed within an opening in the web.

The cam is formed of complementary hollow sheet metal shells 34. These shells may be readily stamped out and are assembled upon the shaft 22 with their open ends in abutment and they may be butt-welded together, if desired. The open end of each shell is of greater diameter than its closed end so that the open ends of the two shells extend between the rollers 26 of the shoes serving to assist in spacing such rollers apart. Each shell has adjacent to its closed end a peripheral bearing portion which is adapted to engage one of the rollers 26 and to take the thrust thereof.

What I claim is:

1. The combination with a brake shoe having a pair of spaced apart rollers at one end and a camshaft positioned in proximity thereto of a cam on the shaft comprising a pair of complementary hollow stampings, each forming one-half of the entire cam, arranged on the shaft with one stamping in engagement with one roller and the other stamping in engagement with the other roller, each stamping having a portion extending between the rollers and engaging the side of the roller engaged by such stamping and abutting the corresponding portion of the other stamping.

2. The combination with a pair of brake shoes having opposed spaced apart ends each provided with a pair of spaced apart bearing members and a camshaft arranged between the ends of said shoes, of a cam on the shaft comprising a pair of complementary hollow sheet metal shells arranged upon the shaft with their open ends in abutment, said shells provided with portions of reduced diameter engaging the faces of the bearing members and portions of greater diameter extending between the bearing members and engaging the inner sides thereof.

3. Brake mechanism including a brake shoe having a pair of spaced apart bearing members, a camshaft disposed in proximity thereto, and a cam on the shaft comprising a pair of hollow shells arranged with their open ends in abutment opposite the interval between the bearing members and with their closed ends in engagement with said bearing members.

4. Brake mechanism comprising, in combination, a brake shoe having a pair of spaced apart rollers, a camshaft positioned in proximity thereto provided with a cam consisting of a pair of complementary hollow sheet metal shells arranged on the shaft with their open ends in abutment between the rollers and held together thereby.

5. A cam comprising a pair of hollow complementary sheet metal shells having open ends arranged in abutment and closed ends of less diameter provided with peripheral bearing surfaces.

6. Brake mechanism comprising, in combination, a pair of brake shoes provided at opposite spaced apart ends with opposed spaced apart rollers, a camshaft in proximity thereto, a cam on the shaft comprising a pair of hollow sheet metal shells, each having a portion of reduced diameter adjacent to its closed end engaging the bearing face of one roller and a portion of greater diameter adjacent to its open end abutting the corresponding portion of the other shell between the rollers and engaging the sides of the rollers whereby said shells are held toward each other by said rollers.

7. As an article of manufacture a cam comprising a pair of hollow complementary sheet metal stampings arranged with their open ends in abutment.

8. A brake applying device comprising in combination, a rotatably supported shaft, a pair of generally ring-shaped hollow sheet metal shells arranged in encircling relationship upon said shaft with their open ends in abutment and having cam contoured peripheral bearing surfaces.

9. A brake applying device comprising, in combination, a rotatably supported shaft, a pair of generally ring-shaped hollow sheet metal shells arranged in encircling relationship upon said shaft with their open ends in abutment and each having a cam contoured peripheral bearing surface adjacent to its closed end and being of less diameter than the portion immediately adjacent to its open end.

10. A brake applying device comprising, in combination, a rotatably supported shaft, a pair of generally ring-shaped hollow sheet metal shells arranged in encircling relationship upon said shaft with their open ends in abutment and having cam contoured peripheral bearing surfaces adjacent to their closed ends and separated by an intermediate portion of a different diameter.

11. A cam comprising a pair of generally ring-shaped hollow sheet metal shells having open end portions of greater diameter than the closed end portions and arranged with their open ends in abutment and an operating member extending through said shells engaged therewith to rotate them as one piece and to maintain them substantially in alignment.

12. A cam comprising a plurality of juxtaposed hollow sheet metal shells so shaped that the cam has a pair of cam contoured peripheral bearing surfaces one adjacent to each end and separated from the other by an intermediate portion of a different diameter.

13. A cam comprising a plurality of generally ring-shaped hollow sheet metal members mounted in juxtaposition upon a support and provided with a cam contoured periphery adjacent to each end and separated from each other by an intermediate portion of a different diameter, at least one of said cam contoured peripheries being formed by a flange formed upon one of said members.

In testimony whereof, I, ROY S. SANFORD, sign this specification.

ROY S. SANFORD.